United States Patent
Wang et al.

(10) Patent No.: US 10,217,423 B2
(45) Date of Patent: Feb. 26, 2019

(54) PIXEL CIRCUIT, DRIVING METHOD THEREOF AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Junwei Wang, Beijing (CN); Hongtao Lin, Beijing (CN); Yingfang Deng, Beijing (CN); Hongyu Zhao, Beijing (CN); Xuan Li, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/539,528

(22) PCT Filed: Aug. 15, 2016

(86) PCT No.: PCT/CN2016/095272
§ 371 (c)(1),
(2) Date: Jun. 23, 2017

(87) PCT Pub. No.: WO2017/128696
PCT Pub. Date: Aug. 3, 2017

(65) Prior Publication Data
US 2018/0122310 A1 May 3, 2018

(30) Foreign Application Priority Data
Jan. 25, 2016 (CN) .......................... 2016 1 0049656

(51) Int. Cl.
*G09G 3/36* (2006.01)
*G02F 1/1343* (2006.01)
*G02F 1/1362* (2006.01)

(52) U.S. Cl.
CPC ............. *G09G 3/36* (2013.01); *G02F 1/1343* (2013.01); *G02F 1/136286* (2013.01);
(Continued)

(58) Field of Classification Search
CPC ..... G09G 2310/0248; G09G 2310/027; G09G 3/3233; G09G 2360/14; G09G 3/3283;
(Continued)

(56) References Cited

U.S. PATENT DOCUMENTS

2005/0093851 A1*   5/2005   Nakamura ............ G06F 3/0412
                                                                345/204
2005/0253829 A1   11/2005   Mamba et al.
(Continued)

FOREIGN PATENT DOCUMENTS

CN   101071208 A   11/2007
CN   102402960 A    4/2012
(Continued)

OTHER PUBLICATIONS

Office Action in Chinese Application No. 201610049656.1 dated Jul. 5, 2017, with English translation.
(Continued)

*Primary Examiner* — Duc Q Dinh
(74) *Attorney, Agent, or Firm* — Womble Bond Dickinson (US) LLP (57) ABSTRACT

Embodiments of the present disclosure provide a pixel circuit, a driving method thereof and a display device comprising the pixel circuit. The pixel circuit comprises a display unit and a first precharge unit; the first precharge unit is connected to the display unit, a $(N-1)^{th}$ scan line and a control line, and is configured to convert light energy into electric energy and to precharge the display unit with the converted electric energy under the control of the control line and the $(N-1)^{th}$ scan line; the display unit is further
(Continued)

connected to the $N^{th}$ scan line and a data line and is configured to charge the display unit through the data line under the control of the $N^{th}$ scan line; wherein $N \geq 2$.

14 Claims, 5 Drawing Sheets

(52) U.S. Cl.
CPC ... *G09G 3/3677* (2013.01); *G09G 2310/0248* (2013.01); *G09G 2310/0264* (2013.01)

(58) Field of Classification Search
CPC ... G09G 2310/0251; G09G 2320/0295; G09G 2320/043; G09G 2320/0626; G09G 2320/0666; G09G 2330/021; G09G 2360/144; G09G 2360/142; G09G 2360/145; G09G 2360/148; G09G 2340/14; G09G 2320/0223; G09G 3/3677; G09G 2300/0426; G09G 2300/0819; G09G 2310/0202; G09G 2310/0289; G09G 3/325; G09G 3/3659; G06F 3/0412; G06F 3/042; G06F 2203/04101; G06F 3/0416; G06F 3/0421; G06F 3/04883; G06F 1/3203; G06F 1/3262; G06F 3/044; G06F 2203/04102; G06F 2203/04103; G06F 2203/04108; G06F 3/03545; G06F 3/0386

USPC .................................. 345/211, 690, 98–100
See application file for complete search history.

(56) References Cited

U.S. PATENT DOCUMENTS

| | | |
|---|---|---|
| 2006/0262055 A1 | 11/2006 | Takahara |
| 2013/0063398 A1 | 3/2013 | Ko et al. |
| 2013/0141417 A1* | 6/2013 | Chen ............... G09G 3/3659 345/215 |
| 2014/0024151 A1 | 1/2014 | Zhang |
| 2015/0116308 A1 | 4/2015 | Wang |
| 2017/0110074 A1 | 4/2017 | Xu |

FOREIGN PATENT DOCUMENTS

| | | |
|---|---|---|
| CN | 102738080 A | 10/2012 |
| CN | 102999227 A | 3/2013 |
| CN | 103413532 A | 11/2013 |
| CN | 104155820 A | 11/2014 |
| CN | 105489186 A | 4/2016 |
| JP | 2007005938 A | 1/2007 |

OTHER PUBLICATIONS

International Search Report and Written Opinion in PCT/CN2016/095272 dated Nov. 15, 2016, with English translation.

* cited by examiner

PIXEL CIRCUIT, DRIVING METHOD THEREOF AND DISPLAY DEVICE

CROSS-REFERENCE TO RELATED APPLICATION

The present application is the U.S. national phase entry of PCT/CN2016/095272, with an international filing date of Aug. 15, 2016, which claims the benefit of Chinese Patent Application No. 201610049656.1, filed on Jan. 25, 2016, the entire disclosures of which are incorporated herein by reference.

TECHNICAL FIELD

The present disclosure relates to the field of display technologies, in particular to a pixel circuit, a driving method thereof and a display device.

BACKGROUND

Liquid Crystal Displays (LCDs) have been used more and more widely at present because of their advantages of the small power consumption, miniaturization, thinness, and so on.

Figure 1:
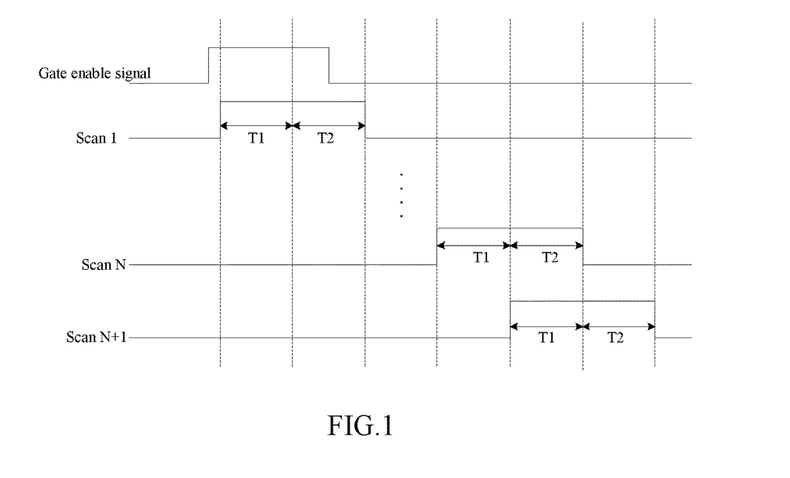
FIG. 1 is a timing diagram of a precharge circuit provided by the related art.

In the Thin Film Transistor (TFT) of the LCD, the high scan frequency might result in insufficient charging time of the pixels. In the related art, as shown in FIG. 1, this technical problem is usually solved by precharge, i.e. the gate enable signal is turned on in advance to cause the scan line Scan to output signals in advance (to output signals since time period T1) so as to turn on the gate of the TFT. In this case, the pixels can be charged in advance so that the pixels can be charged to the desired potential more quickly within the actual charging time period T2.

However, signals need to be input into the scan line Scan at both the precharging time period T1 and the actual charging time period T2, and when charging through the $N^{th}$ scan line Scan N, signals need to be input into the $(N+1)^{th}$ scan line Scan N+1 for precharging, thus interference may be incurred between the $N^{th}$ scan line Scan N and the $(N+1)^{th}$ scan line Scan N+1, and the load on the IC (Integrated Circuit) or GOA (Gate Driver on Array, array substrate line driving technique) unit for driving the scan lines may become too large to enable sufficient outputs.

SUMMARY

According to a first aspect of the present disclosure, a pixel circuit is provided, comprising a display unit and a first precharge unit; the first precharge unit is connected to the display unit, a $(N-1)^{th}$ scan line and a control line, and is configured to convert light energy into electric energy and to pre-charge the display unit with the converted electric energy under the control of the control line and the $(N-1)^{th}$ scan line; the display unit is further connected to the $N^{th}$ scan line and a data line and is configured to charge the display unit through the data line under the control of the $N^{th}$ scan line; wherein N≥2.

Optionally, the pixel circuit further comprises a second precharge unit; the second precharge unit is connected to the display unit, the $(N-1)^{th}$ scan line and the control line, and is configured to convert light energy into electric energy and to reversely pre-charge the display unit under the control of the control line and the $(N-1)^{th}$ scan line; wherein the first precharge unit and the second precharge unit do not work simultaneously.

Optionally, the first precharge unit includes a first transistor, a second transistor and a photosensitive energy storage element; the first transistor has its gate connected to the control line, its first terminal connected to the $(N-1)^{th}$ scan line and its second terminal connected to a gate of the second transistor; the second transistor has its first terminal connected to a first end of the display unit, and its second terminal connected to a first terminal of the photosensitive energy storage element; and the photosensitive energy storage element has its second terminal connected to a second end of the display unit.

Optionally, in the case where the pixel circuit further comprises a second precharge unit, the second precharge unit includes a third transistor, a fourth transistor, and a photosensitive energy storage element; the third transistor has its gate connected to the control line, its first terminal connected to the $(N-1)^{th}$ scan line and its second terminal connected to a gate of the fourth transistor; the fourth transistor has its first terminal connected to the first end of the display unit and its second terminal connected to the second terminal of the photosensitive energy storage element; the photosensitive energy storage element has its first terminal connected to the second end of the display unit, wherein the first transistor and the third transistor are each P-type or N-type transistors, and the first transistor and the third transistor are mutually different types of transistors.

Optionally, the display unit includes a fifth transistor, a liquid crystal capacitor and a storage capacitor; the fifth transistor has its gate connected to the $N^{th}$ scan line, its first terminal connected to the data line, and its second terminal connected to first ends of the liquid crystal capacitor and the storage capacitor; and second ends of the liquid crystal capacitor and the storage capacitor are connected to a common voltage terminal.

According to a second aspect of the present disclosure, a display device is provided, comprising the above-described pixel circuit.

According to a third aspect of the present disclosure, a driving method for a pixel circuit is provided, comprising: converting light energy into electric energy by the first precharge unit, and pre-charging the display unit connected to the $N^{th}$ scan line with the converted electric energy under the control of the control line and the $(N-1)^{th}$ scan line; charging the display unit through the data line under the control of the $N^{th}$ scan line.

Optionally, the pixel circuit comprises the second precharge unit and the driving method comprises:

in a first frame, converting light energy into electric energy by the first precharge unit, and pre-charging the display unit connected to the $N^{th}$ scan line with the converted electric energy under the control of the control line and the $(N-1)^{th}$ scan line; and charging the display unit through the data line under the control of the $N^{th}$ scan line;

in a second frame, converting light energy into electric energy by the second precharge unit, and reversely precharging the display unit connected to the $N^{th}$ scan line with the converted electric energy under the control of the control line and the $(N-1)^{th}$ scan line; and reversely charging the display unit through the data line under the control of the $N^{th}$ scan line; and repeating the first frame and the second frame.

Optionally, the first precharge unit includes a first transistor, a second transistor, and a photosensitive energy storage element, the first precharge unit converts light energy into electric energy and precharges the display unit connected to the $N^{th}$ scan line with the converted electric energy under the control of the control line and the $(N-1)^{th}$ scan line; the driving method further comprises: while inputting scan signals into the (N−1)$^{th}$ scan line, inputting signals into the control line so as to turn on the first transistor and the second transistor, and then precharging the display unit connected to the N$^{th}$ scan line with the electric energy converted by the photosensitive energy storage element.

Optionally, in the case where the pixel circuit further comprises a second precharge unit and the second precharge unit includes a third transistor, a fourth transistor, and a photosensitive energy storage element, the second precharge unit converts the light energy into electric energy and reversely precharges the display unit connected to the N$^{th}$ scan line with the converted electric energy under the control of the control line and the (N−1)$^{th}$ scan line; the driving method further comprises: while inputting scan signals into the (N−1)$^{th}$ scan line, inputting signals into the control line so as to turn on the third transistor and the fourth transistor, and then reversely precharging the display unit connected to the N$^{th}$ scan line with the electric energy converted by the photosensitive energy storage element.

BRIEF DESCRIPTION OF THE DRAWINGS

In order to more clearly illustrate the embodiments of the present disclosure, the drawings that are to be used in the descriptions of the embodiments will be briefly introduced below. Apparently, the drawings in the following description are merely some embodiments of the present disclosure, and other drawings can be obtained by those skilled in the art from these drawings without using inventive skills.

DETAILED DESCRIPTION

Technical solutions in the embodiments of the present disclosure will be now described clearly and completely with reference to the drawings in the embodiments of the present disclosure. But obviously, the described embodiments are only some, instead of all, of the embodiments. All other embodiments that can be obtained by those ordinarily skilled in the art on the basis of the embodiments in the present disclosure without using any inventive skill shall fall into the protection scope of the present disclosure.

Figure 2:
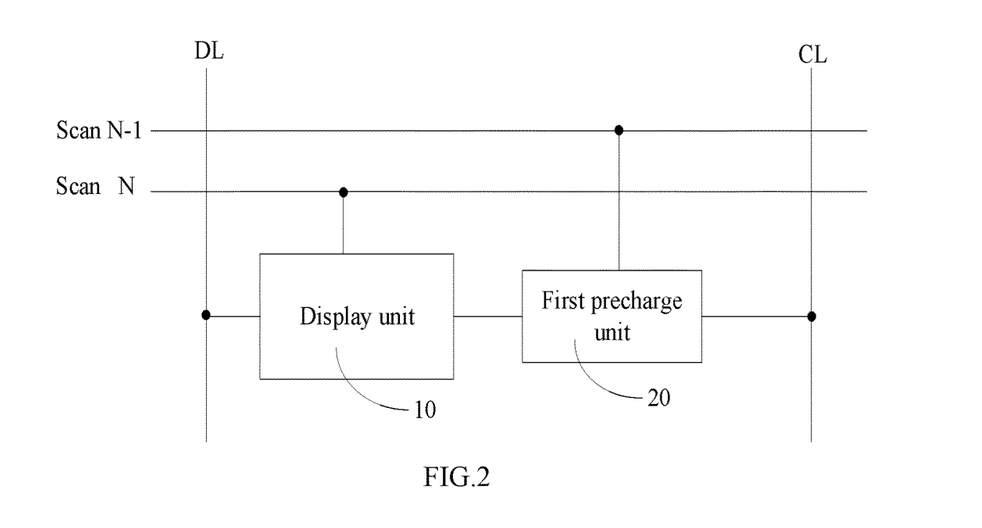
FIG. 2 is a schematic diagram of a pixel circuit according to an embodiment of the present disclosure.

An embodiment of the present disclosure provides a pixel circuit comprising a display unit 10 and a first precharge unit 20 as shown in FIG. 2.

The first precharge unit 20 is connected to the display unit 10, the (N−1)$^{th}$ scan line Scan N−1 and the control line CL, and is configured to convert light energy into electric energy, and to precharge the display unit 10 with the converted electric energy under the control of the control line CL and the (N−1)$^{th}$ scan line Scan N−1.

The display unit 10 is connected to the N$^{th}$ scan line Scan N and the data line DL, and is configured to charge the display unit 10 through the data line DL under the control of the N$^{th}$ scan line Scan N.

In this embodiment, N≥2.

When signals have been input into the (N−1)$^{th}$ scan line Scan N−1, the data line DL can charge the display unit 10 connected to the (N−1)$^{th}$ scan line Scan N−1 for displaying. At the same time, the first precharge unit 20 connected to the (N−1)$^{th}$ scan line Scan N−1 can absorb light energy to convert it into electric energy, and precharge the display unit 10 connected to the N$^{th}$ scan line Scan N under the control of both the control line CL and the (N−1)$^{th}$ scan line Scan N−1. At this time, since the N$^{th}$ scan line has no input signal, the display unit 10 connected to the N$^{th}$ scan line Scan N does not display anything.

It is to be noted that since the display unit 10 can emit light when displaying, the first precharge unit 20 can absorb light emitted from the display unit 10 connected to the (N−1)$^{th}$ scan line Scan N−1 to convert it into electric energy. Of course, the first precharge unit 20 may also utilize light emitted by the backlight to produce electric energy. This depends on the different display devices to which the pixel circuit is applied, but no matter what kind of display device it is, the first precharge unit 20 can utilize light emitted by the display device itself to realize conversion from light energy into electric energy.

In the embodiment of the present disclosure, the first precharge unit 20 converts light energy into electric energy and precharges the display unit 10 connected to the N$^{th}$ scan line Scan N with the converted electric energy under the control of the control line CL and the (N−1)$^{th}$ scan line Scan N−1. On this basis, after inputting signals into the N$^{th}$ scan line Scan N, charging of the display unit 10 connected to the N$^{th}$ scan line Scan N is continued through the data line DL, so that the display unit 10 connected to the N$^{th}$ scan line Scan N will be quickly charged to a desired potential without being limited by the scan frequency. Since it is unnecessary to input signals to two scan lines simultaneously, and the electric energy converted from light energy is used for precharging, the problem of excessive load caused by simultaneous input of signals into two scan lines or the problem of interference between two scan lines in the related art can be mitigated.

Figure 3:
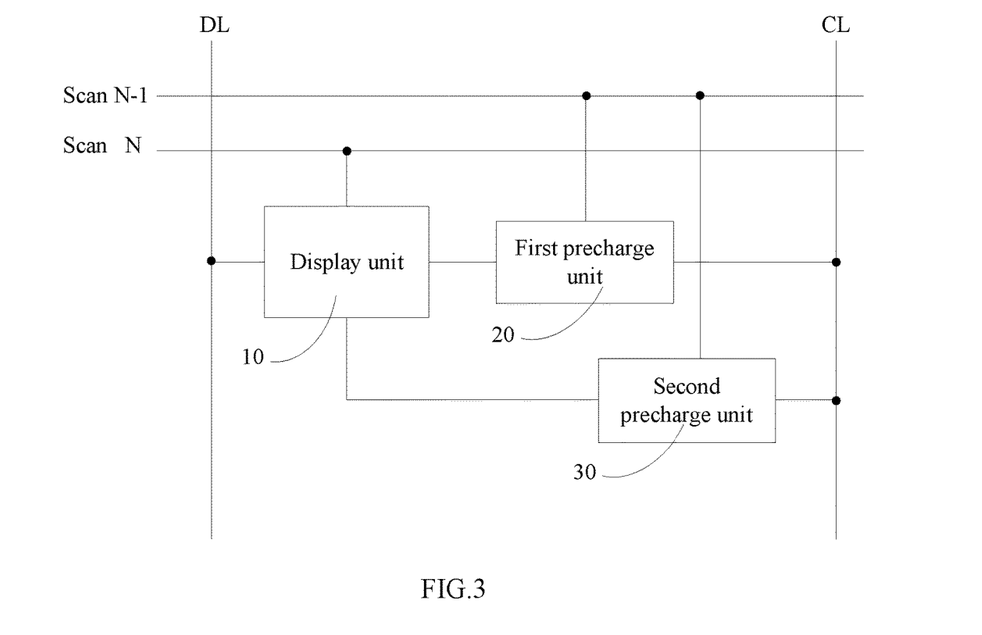
FIG. 3 is a schematic diagram of a pixel circuit according to another embodiment of the present disclosure.

In another embodiment, the above-mentioned pixel circuit may further comprise a second precharge unit 30, as shown in FIG. 3. The second precharge unit 30 is connected to the display unit 10, the (N−1)$^{th}$ scan line Scan N−1, and the control line CL for converting light energy into electric energy and reversely precharging the display unit 10 under the control of the control line CL and the (N−1)$^{th}$ scan line Scan N−1; wherein the first precharge unit 20 and the second precharge unit 30 do not work at the same time.

When signals have been input into the (N−1)$^{th}$ scan line Scan N−1, the data line DL can charge the display unit 10 connected to the (N−1)$^{th}$ scan line Scan N−1 for displaying. At the same time, the second precharge unit 30 connected to the (N−1)$^{th}$ scan line Scan N−1 can absorb light energy to convert it into electric energy, and reversely precharge the display unit 10 connected to the N$^{th}$ scan line Scan N under the control of both the control line CL and the (N−1)$^{th}$ scan line Scan N−1. At this time, since the N$^{th}$ scan line has no input signal, the display unit 10 connected to the N$^{th}$ scan line Scan N does not display anything.

On this basis, when signals have been input into the $N^{th}$ scan line Scan N, reverse charging of the display unit 10 connected to the $N^{th}$ scan line Scan N can be continued through the data line DL, so that the display unit 10 connected to the $N^{th}$ scan line Scan N can be quickly charged to the desired potential.

In order to allow the first precharge unit 20 and the second precharge unit 30 to not operate at the same time, different signals may be input into the control line CL. For example, when high level signals are input into the control line CL, the first precharge unit 20 operates to precharge the display unit 10, while the second precharge unit 30 does not operate at this time. When low level signals are input into the control line CL, the second precharge unit 30 operates to reversely precharge the display unit 10, while the first precharge unit 20 does not operate at this time.

It shall be noted that similar to the first precharge unit 20, the second precharge unit 30 can absorb light emitted by the display unit 10 that displays and convert it into electric energy, or it can also use light emitted from the backlight to produce electric energy, depending on the different display devices to which the pixel circuit is applied. But no matter what kind of display device it is, the second precharge unit 30 can utilize light emitted by the display device itself to realize conversion from light energy into electric energy.

In addition, the second precharge unit 30 reversely precharging the display unit 10 is relative to the first precharge unit 20 precharging the display unit 10. So, in the embodiment of the present disclosure, the first precharge unit 20 precharging the display unit 10 can be referred to as forward precharging.

The second precharge unit 30 reversely precharging the display unit 10 means that when the second precharge unit 30 precharges the display unit 10, the flowing direction of the current in the display unit 10 is opposite to the flowing direction of the current when the first precharge unit 20 precharges the display unit 10.

As for the voltage across two ends of a liquid crystal layer in the liquid crystal display, if a positive voltage is kept on the first end and a negative voltage is kept on the second end, or if a negative voltage is kept on the first end and a positive voltage is kept on the second end, then the liquid crystals will keep deflecting toward a same direction, which will easily cause aging of the liquid crystal. In the embodiment of the present disclosure, the first precharge unit 20 and the second precharge unit 30 are used alternately to forwardly and reversely charge the display unit 10 so as to allow liquid crystals in the liquid crystal display to deflect in different directions, thereby mitigating the liquid crystal aging problem and increasing the life of the liquid crystal display.

Figure 4:
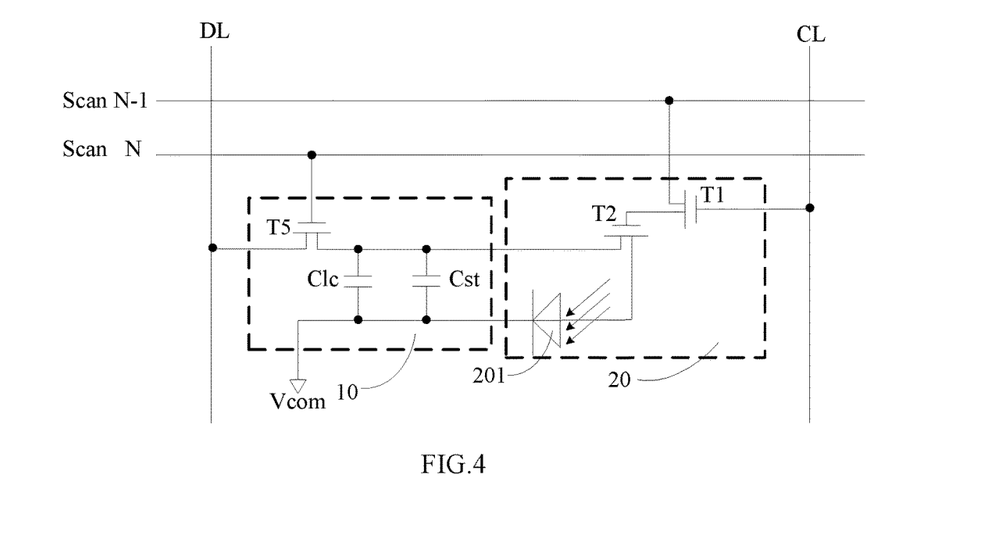
FIG. 4 is a schematic diagram of a pixel circuit according to still another embodiment of the present disclosure.

In another embodiment, as shown in FIG. 4, the first precharge unit 20 includes a first transistor T1, a second transistor T2, and a photosensitive energy storage element 201; the first transistor T1 has its gate connected to the control line CL, its first terminal connected to the $(N-1)^{th}$ scan line Scan N−1 and its second terminal connected to a gate of the second transistor T2.

The second transistor T2 has its first terminal connected to a first end of the display unit 10, and its second terminal connected to a first terminal of the photosensitive energy storage element 201.

The photosensitive energy storage element 201 has its second terminal connected to a second end of the display unit 10.

Here, the first transistor T1 and the second transistor T2 may both be N-type transistors or P-type transistors, or one of them is a P-type transistor, and the other is an N-type transistor so that the second transistor T2 is in an ON state when signals are input into the $(N-1)^{th}$ scan line Scan N−1

It is to be noted that the first precharge unit 20 may further include a plurality of switching transistors connected in parallel with the first transistor T1 and the second transistor T2. The above is merely an exemplary illustration of the first precharge unit 20, while other structures having the same function as the first precharge unit 20 will not be described herein any more, but they should fall within the protection scope of the present disclosure.

In the embodiment of the present disclosure, when the first transistor T1 is an N-type transistor, for example, when high-level signals are input into the control line CL, the first transistor T1 is turned on, and signals input into the $(N-1)^{th}$ scan line Scan N−1 are input to the gate of the second transistor T2 through the first transistor T1 so as to turn on the second transistor T2. At this time, a loop is formed between the display unit 10 and the photosensitive energy storage element 201, so when the photosensitive energy storage element 201 converts the light energy into electric energy, the display unit 10 connected to the $N^{th}$ scan line Scan N can be precharged.

Figure 5:
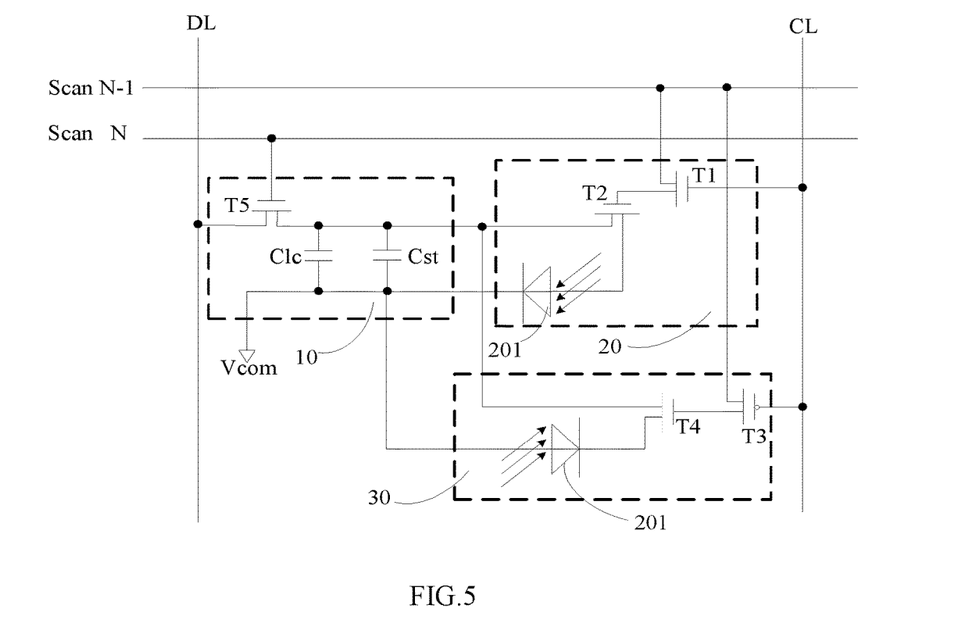
FIG. 5 is a schematic diagram of a pixel circuit according to yet another embodiment of the present disclosure.

Further, as shown in FIG. 5, the second precharge unit 30 includes the third transistor T3, the fourth transistor T4, and the photosensitive energy storage element 201 in the case where the pixel circuit further comprises the second precharge unit 30.

The gate of the third transistor T3 is connected to the control line CL, the first terminal thereof is connected to the $(N-1)^{th}$ scan line Scan N−1, and the second terminal thereof is connected to the gate of the fourth transistor T4.

The first terminal of the fourth transistor T4 is connected to the first end of the display unit 10, and the second terminal thereof is connected to the second terminal of the photosensitive energy storage element 201.

The first terminal of the photosensitive energy storage element 201 is connected to the second end of the display unit 10.

The first transistor T1 and the third transistor T3 are each P-type or N-type transistors, and the first transistor and the third transistor are mutually different types of transistors.

The first transistor T1 and the third transistor T3 being mutually different types of transistors means that if the first transistor T1 is a P-type transistor, then the third transistor T3 is an N-type transistor, or if the first transistor T1 is an N-type transistor, then the third transistor T3 is a P-type transistor. In the embodiment of the present disclosure, the example that the first transistor T1 is N-type and the third transistor T3 is P-type is described.

Since the first transistor T1 is N-type and the third transistor T3 is P-type, when high-level signals are input into the control line, the first transistor T1 is turned on and the third transistor T3 is turned off; when low-level signals are input into the control line, the third transistor T3 is turned on and the first transistor T1 is turned off.

The fourth transistor T4 may be a P-type or N-type transistor such that when the third transistor T3 is ON and when signals are input into the $(N-1)^{th}$ scan line Scan N−1, the fourth transistor T4 is in an ON state.

It shall be noted that the second precharge unit 30 may further include a plurality of switching transistors connected in parallel with the third transistor T3 and the fourth transistor T4. The above is merely an exemplary illustration of the second precharge unit 30, while other structures having the same function as the second precharge unit 30 will not be described herein any more, but they should fall within the protection scope of the present disclosure.

In addition, no limitation is made to the first terminal and the second terminal of the photosensitive energy storage element 201. For example, the first terminal is a positive electrode and the second terminal is a negative electrode; of course, as an alternative, the second terminal can be a negative electrode and the first terminal can be a positive electrode.

Moreover, no limitation is made to the first terminal and the second terminal of all transistors. For example, the first terminal can be a drain and the second terminal can be a source; as an alternative, the first terminal can be a source and the second terminal can be a drain.

When low level signals are input into the control line CL, the third transistor T3 is turned on and signals input into the $(N-1)^{th}$ scan line Scan N−1 are input to the gate of the fourth transistor T4 through the third transistor T3, so that the fourth transistor T4 is turned on. At this time, a loop is formed between the display unit 10 and the photosensitive energy storage element 201, and the photosensitive energy storage element 201 converts light energy into electric energy so as to precharge the display unit 10 connected to the $N^{th}$ scan line Scan N.

In the embodiment of the present disclosure, when signals are input into the control line CL, only one of the first transistor T1 and the third transistor T3 is turned on, thereby forming a loop to charge the display unit 10. The first terminal of the photosensitive energy storage element 201 in the first precharge unit 20 is connected to the first end of the display unit 10 and the second terminal thereof is connected to the second end of the display unit 10, and the second terminal of the photosensitive energy storage element 201 in the second precharge unit 30 is connected to the first end of the display unit 10 and the first terminal thereof is connected to the second end of the display unit 10, therefore the first precharge unit 20 and the second precharge unit 30 charge the display unit 10 in opposite directions. On this basis, in the embodiment of the present disclosure, the first precharge unit 20 and the second precharge unit 30 can be controlled by signals of the control line CL and the $(N-1)^{th}$ scan line Scan N−1 to forwardly and reversely precharge the display unit 10 connected to the $N^{th}$ scan line Scan N respectively at different moments, so that the liquid crystals in the liquid crystal display can deflect in different directions to prevent aging of the liquid crystals and increase the service life of the display.

Optionally, as shown in FIGS. 4 and 5, the display unit 10 includes a fifth transistor T5, a liquid crystal capacitor Clc, and a storage capacitor Cst.

The fifth transistor T5 has its gate connected to the $N^{th}$ scanning line Scan N, its first terminal connected to the data line DL, and its second terminal connected to first ends of the liquid crystal capacitor Clc and the storage capacitor Cst; and second ends of the liquid crystal capacitor Clc and the storage capacitor Cst are connected to a common voltage terminal Vcom.

The liquid crystal capacitor Clc is for supplying power at the time of displaying, and the storage capacitor Cst is for storing power for the liquid crystal display so as to supplement power to the display when the power is low during displaying.

In the embodiment of the present disclosure, when signals are input into the $N^{th}$ scan line Scan N, the fifth transistor T5 is in an ON state, and signals input into the data line DL are then input into the liquid crystal capacitor Clc and the storage capacitor Cst of the display unit 10 through the fifth transistor T5 for charging, and the display unit 10 can display under the control of the signals provided by the data line DL and the common voltage terminal Vcom.

It shall be noted that in the above embodiment of the present disclosure, the first end of the display unit as well as the first end of the liquid crystal capacitor Clc and the storage capacitor Cst are connected to pixel electrodes, and the second end of the display unit as well as the second end of the liquid crystal capacitor Clc and the storage capacitor Cst are connected to the common voltage terminal Vcom (common electrode).

An embodiment of the present disclosure further provides a display device comprising the above-described pixel circuit.

Figure 6:
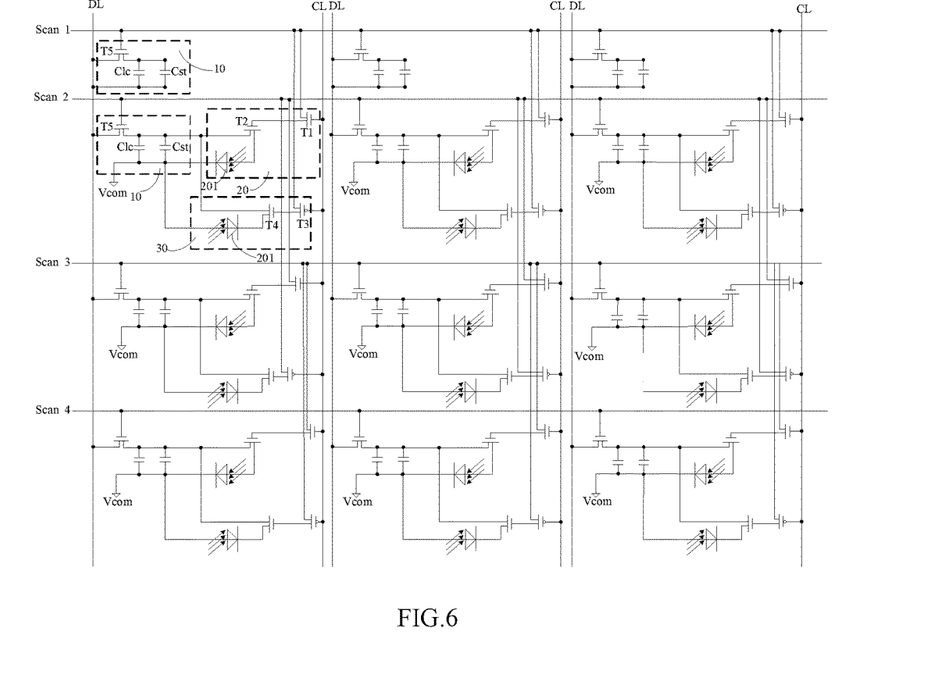
FIG. 6 is a schematic diagram of a pixel circuit of a display device according to an embodiment of the present disclosure.

As shown in FIG. 6, each of the scan lines is connected to a plurality of pixel units. Except for the pixel units connected to the first scan line Scan1, pixel units connected to other scan lines each include the above-mentioned pixel circuit. The pixel units connected to the first scan line Scan1 may include only the display unit 10, which can be precharged by means of turning on the gate enable signals in advance.

When signals are input into the $(N-1)^{th}$ scanning line Scan N−1, the data line DL can charge all the display units 10 connected to the $(N-1)^{th}$ scan line Scan N−1 so as to make all display units 10 connected to the $(N-1)^{th}$ scan line Scan N−1 to display. At the same time, all the first precharge units 20 or all the second precharge units 30 connected to the $(N-1)^{th}$ scan line Scan N−1 can absorb light energy and convert the light energy into electric energy, thereby forwardly or reversely precharging the display units 10 connected to both the $(N-1)^{th}$ scan line Scan N−1 and the $N^{th}$ scan line Scan N. In this case, since the $N^{th}$ scan line Scan N has no input signal, all the display units 10 connected to the $N^{th}$ scan line do not display anything On this basis, when signals are input into the $N^{th}$ scan line Scan N, forward or reverse charging of the display unit 10 connected to the Nth scan line Scan N is continued through the data line DL, so that the display unit 10 connected to the $N^{th}$ scan line Scan N can be quickly charged to a desired potential.

The display device in the embodiment of the present disclosure may be any product or component having a display function, such as a mobile phone, a tablet computer, a monitor, a notebook computer, a digital camera, or the like.

Figure 7:
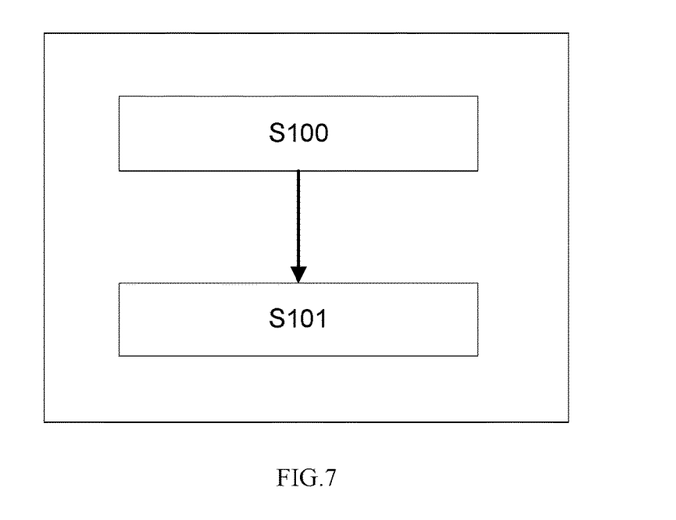
FIG. 7 is a flow chart of a driving method for a pixel circuit according to an embodiment of the present disclosure.

An embodiment of the present disclosure further provides a driving method for the above-described pixel circuit, as shown in FIG. 7, comprising:

in step S100, the first precharge unit 20 converts light energy into electric energy and precharges the display unit 10 connected to the $N^{th}$ scan line with the converted electric energy under the control of the control line CL and the $(N-1)^{th}$ scan line Scan N−1.

When inputting signals into the $(N-1)^{th}$ scan line Scan N−1, the first precharge unit 20 connected to the $(N-1)^{th}$ scan line Scan N−1 converts light energy into electric energy under the control of the $(N-1)^{th}$ scan line Scan N−1 and the control line CL so as to precharge the display unit 10 connected to the $N^{th}$ scan line Scan N.

In step S101, the display unit 10 is charged through the data line DL under the control of the $N^{th}$ scan line Scan N.

When signals are input into the $N^{th}$ scan line Scan N, (at this time, input of signals into the $(N-1)^{th}$ scan line Scan N−1 is stopped, and the process of the first precharge unit 20 precharging the display unit 10 connected to the $N^{th}$ scan line Scan N terminates), the input signals on the data line DL continue to charge the display unit 10 connected to the $N^{th}$ scan line Scan N.

In the embodiment of the present disclosure, the first precharge unit 20 converts light energy into electric energy and precharges the display unit 10 connected to the $N^{th}$ scan line with the converted electric energy under the control of the control line CL and the $(N-1)^{th}$ scan line Scan N−1. On this basis, after inputting signals into the $N^{th}$ scan line Scan N, charging of the display unit 10 connected to the $N^{th}$ scan line Scan N is continued through the data line, so that the display unit 10 connected to the $N^{th}$ scan line Scan N can be quickly charged to a desired potential without being limited by the scan frequency. Since it is unnecessary to input signals to two scan lines simultaneously, and the embodiments of the present disclosure use the electric energy converted from light energy for precharging, the problem of excessive load caused by simultaneous input of signals into two scan lines or the problem of interference between two scan lines in the related art can be mitigated.

Figure 8:
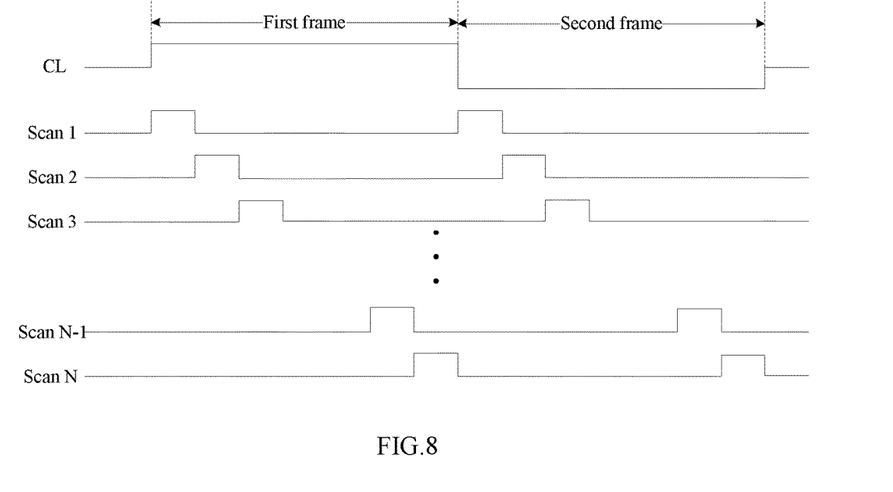
FIG. 8 a timing diagram of a driving pixel circuit according to an embodiment of the present disclosure.

In the case where the pixel circuit comprises a second precharge unit 30, the above driving method can be understood with reference to the timing diagram shown in FIG. 8.

As shown in FIG. 8, in the first frame, the first precharge unit 20 converts light energy into electric energy and precharges the display unit 10 connected to the $N^{th}$ scan line Scan N with the converted electric energy under the control of the control line CL and the $(N-1)^{th}$ scan line Scan N−1; and charges the display unit 10 through the data line DL under the control of the $N^{th}$ scan line Scan N.

In the first frame, after inputting signals into the $(N-1)^{th}$ scan line Scan N−1, signals input into the control line CL can be controlled such that to the first precharge unit 20 precharges the display unit 10 connected to the $N^{th}$ scan line Scan N and that the electric energy converted by the second precharge unit 30 cannot reach the display unit 10 connected to the $N^{th}$ scan line Scan N.

On this basis, when inputting signals into the $N^{th}$ scan line Scan N, the data line DL continues to charge the display unit 10 connected to the $N^{th}$ scan line Scan N.

As shown in FIG. 8, in the second frame, the second precharge unit 30 converts light energy into electric energy, and reversely precharges the display unit 10 connected to the $N^{th}$ scan line Scan N with the converted electric energy under the control of the control line CL and the $(N-1)^{th}$ scan line Scan N−1; and reversely charges the display unit 10 through the data line DL under the control of the $N^{th}$ scan line Scan N.

In the second frame, after inputting signals into the $(N-1)^{th}$ scan line Scan N−1, signals input into the control line CL can be controlled such that the second precharge unit 30 reversely precharges the display unit 10 connected to the $N^{th}$ scan line Scan N and that the electric energy converted by the first precharge unit 20 cannot reach the display unit 10 connected to the $N^{th}$ scan line Scan N.

On this basis, when inputting signals into the $N^{th}$ scan line Scan N, the data line DL continues to reversely charge the display unit 10 connected to the $N^{th}$ scan line Scan N.

Then steps performed in the first frame and the second frame are repeated.

It shall be noted that the second precharge unit 30 reversely precharging the display unit 10 is relative to direction of the first precharge unit 20 precharging the display unit 10. In the embodiment of the present disclosure, the first precharge unit 20 precharging the display unit 10 can be referred to as forward precharging.

In the embodiment of the present disclosure, in the first frame and the second frame, the display unit 10 is subjected to forward precharging and reverse precharging, respectively, so that the current flowing directions in the display unit 10 are opposite to allow the liquid crystals to deflect in different directions, thereby preventing aging of the liquid crystals and extending the service life of the liquid crystal display.

In the case where the first precharge unit 20 includes the first transistor T1, the second transistor T2, and the photosensitive energy storage element 201, step S100 specifically includes:

inputting signals into the control line CL while inputting signals into the $(N-1)^{th}$ scan line Scan N−1 so as to turn on the first transistor T1 and the second transistor T2. The electric energy converted by the photosensitive energy storage element 201 then precharges the display unit 10 connected to the $N^{th}$ scan line Scan N.

For example, in the case where the first transistor T1 is an N-type transistor, when inputting signals into the $(N-1)^{th}$ scan line Scan N−1, the first transistor T1 can be turned on by inputting high-level signals into the control line CL. The signals input into the $(N-1)^{th}$ scan line Scan N−1 are input to the gate of the second transistor T2 through the first transistor T1 so as to turn on the second transistor T2. Then the photosensitive energy storage element 201 forms a loop with the display unit 10 that is connected to both the photosensitive energy storage element 201 and the $N^{th}$ scan line Scan N, and the photosensitive energy storage element 201 converts light energy into electric energy, so that the converted electric energy can be used to precharge the display unit through the loop.

In addition, in the case where the pixel circuit further comprises the second precharge unit 30 and the second precharge unit 30 includes the third transistor T3, the fourth transistor T4, and the photosensitive energy storage element 201, the second precharge unit 30 converts light energy into electric energy and reversely precharges the display unit 10 connected to the $N^{th}$ scan line Scan N with the converted electric energy under the control of the control line CL and the $(N-1)^{th}$ scan line Scan N−1, which includes: inputting signals to the control line CL while inputting scan signals to the $(N-1)^{th}$ scan line Scan N−1 so as to turn on the third transistor T3 and the fourth transistor T4, therefore, the electric energy converted by the photosensitive energy storage element 201 can be used for reversely precharging the display unit 10 connected to the $N^{th}$ scan line Scan N.

For example, in the case where the third transistor T3 is a P-type transistor, when inputting signals into the $(N-1)^{th}$ scan line Scan N−1, the third transistor T3 can be turned on by inputting low-level signals into the control line CL. The signals input into the $(N-1)^{th}$ scan line Scan N−1 are input to the gate of the fourth transistor T4 through the third transistor T3 so as to turn on the fourth transistor T4. Then the photosensitive energy storage element 201 forms a loop with the display unit 10 that is connected to both the photosensitive energy storage element 201 and the $N^{th}$ scan line Scan N, and the photosensitive energy storage element 201 converts light energy into electric energy, so that the converted electric energy can be used to reversely precharge the display unit through the loop.

A specific embodiment is provided below to describe in detail the operation process of the above-described display device.

As shown in FIG. 6, the pixel unit connected to the first scan line Scan 1 includes only the display unit 10. The display unit 10 includes a fifth transistor T5, a liquid crystal capacitor Clc, and a storage capacitor Cst. The gate of the fifth transistor T5 is connected to the first scan line Scan 1, the source thereof is connected to the data line DL, and the drain thereof is connected to the first ends of the liquid crystal capacitor Clc and the storage capacitor Cst. The second ends of the liquid crystal capacitor Clc and the storage capacitor Cst are connected to the common voltage terminal Vcom.

The pixel unit connected to other scan lines than the first scan line Scan 1 includes not only the display unit 10 but also the first precharge unit 20 and the second precharge unit 30. The display unit 10 includes the fifth transistor T5, the liquid crystal capacitor Clc, and the storage capacitor Cst. The first precharge unit 20 includes the first transistor T1, the second transistor T2, and the photosensitive energy storage element 201. The second precharge unit 30 includes the third transistor T3, the fourth transistor T4, and the photosensitive energy storage element 201. The first transistor T1, the second transistor T2, the fourth transistor T4 and the fifth transistor T5 are N-type transistors, and the third transistor T3 is a P-type transistor. Besides, the components in the pixel unit have the following connection relations:

the gate of the fifth transistor T5 is connected to the $N^{th}$ scan line Scan N, the source thereof is connected to the data line DL, and the drain thereof is connected to the first ends of the liquid crystal capacitor Clc and the storage capacitor Cst; while the second ends of the liquid crystal capacitor Clc and the storage capacitor Cst are connected to the common voltage terminal Vcom;

the gate of the first transistor T1 is connected to the control line CL, the source thereof is connected to the $(N-1)^{th}$ scan line Scan N-1, and the drain thereof is connected to the gate of the second transistor T2; the source of the second transistor T2 is connected to the first end of the display unit 10, and the drain thereof is connected to a positive electrode of the photosensitive energy storage element 201 in the first precharge unit 20; while a negative electrode of the photosensitive energy storage element 201 in the first precharge unit 20 is connected to the second end of the display unit 10;

the gate of the third transistor T3 is connected to the control line CL, the source thereof is connected to the $(N-1)^{th}$ scan line Scan N-1, and the drain thereof is connected to the gate of the fourth transistor T4; the source of the fourth transistor T4 is connected to the first end of the display unit 10, and the drain thereof is connected to the negative electrode of the photosensitive energy storage element 201 in the second precharge unit 30; while the positive electrode of the photosensitive energy storage element 201 in the second precharge unit 30 is connected to the second end of the display unit 10.

As shown in FIG. 8, in the first frame, the gate enable signal is turned on in advance so that signals are input into the first scan line Scan 1 in advance to turn on all the fifth transistors T5 connected to the first scan line Scan 1. Signals input into the data line DL are input into the liquid crystal capacitor Clc and the storage capacitor Cst of the pixel unit through the fifth transistors T5 for precharging. During the charging period of the first scan line Scan 1, all the display units 10 connected to the first scan line Scan 1 continues to be charged by the data line DL, so that the liquid crystal capacitors Clc and the storage capacitors Cst in the display units 10 can be quickly charged to the desired potential. While charging all the display units 10 connected to the first scan line Scan 1, the control line CL outputs high level signals to turn on the first transistor T1 in the pixel unit connected to a second scan line Scan 2 and turn off the third transistor T3. At this time, signals input into the first scan line Scan 1 turn on the second transistor T2 through the first transistor T1, so that the photosensitive energy storage element 201 in the first precharge unit 20 forms a loop with the display unit 10 connected thereto. The photosensitive energy storage element 201 is equivalent to a power source, which precharges the liquid crystal capacitor Clc and the storage capacitor Cst in the loop with the converted electric energy. When signal input into the first scan line Scan 1 stops, signals are input into the second scan line Scan 2 so as to turn on all the fifth transistors T5 connected to the second scan line Scan 2. The signals supplied from the data line DL are passed through the fifth transistor T5 to the liquid crystal capacitor Clc and the storage capacitor Cst for charging. The display unit 10 connected to the second scan line Scan 2 has been precharged when inputting signals into the first scan line Scan 1, so when inputting signals into the second scan line Scan 2, the display unit 10 connected to the second scan line Scan 2 can be quickly charged to the desired potential and display. Likewise, the display units 10 connected to a third scan line Scan 3, a fourth scan line Scan 4, . . . and the $N^{th}$ scan line Scan N are precharged and continue to be charged in sequence.

In the second frame, the gate enable signal is turned on in advance so that signals are input into the first scan line Scan 1 in advance to turn on all the fifth transistors T5 connected to the first scan line Scan 1. Signals input into the data line DL are input into the liquid crystal capacitor Clc and the storage capacitor Cst of the pixel unit through the fifth transistors T5 for precharging. During the charging period of the first scan line Scan 1, the data line DL continues to charge all the display units 10 connected to the first scan line Scan 1, so that the liquid crystal capacitors Clc and the storage capacitors Cst in the display units 10 can be quickly charged to the desired potential. While charging all the display units 10 connected to the first scan line Scan 1, low level signals are input into the control line CL to turn on the third transistor T3 in the pixel unit connected to the second scan line Scan 2 and turn off the first transistor T1. Signals input into the first scan line Scan 1 turn on the fourth transistor T4 through the third transistor T3, so that the photosensitive energy storage element 201 in the second precharge unit 20 forms a loop with the display unit 10 connected thereto. The photosensitive energy storage element 201 is equivalent to a power source, which precharges the liquid crystal capacitor Clc and the storage capacitor Cst in the loop with the converted electric energy in a direction opposite to the precharge direction in the first frame. When signal input into the first scan line Scan 1 stops, signals are input into the second scan line Scan 2 so as to turn on all the fifth transistors T5 connected to the second scan line Scan 2. The signals on the data line DL are passed through the fifth transistor T5 to the liquid crystal capacitor Clc and the storage capacitor Cst for reverse charging. The display unit 10 connected to the second scan line Scan 2 has been precharged when inputting signals into the first scan line Scan 1, so when inputting signals into the second scan line Scan 2, the display unit 10 connected to the second scan line Scan 2 can be quickly charged to the desired potential and display. Likewise, the display units 10 connected to the third scan line Scan 3, the fourth scan line Scan 4, . . . and the $N^{th}$ scan line Scan N are reversely precharged and continue to be charged in sequence.

It will be understood by those of ordinary skill in the art that all or some of the steps for implementing the method embodiments described above may be carried out by hardware associated with program instructions, and the program may be stored in a computer-readable storage medium to carry out steps of the method embodiments described above when executed. The aforementioned storage medium includes a variety of mediums, such as ROM, RAM, disk, or optical disk, that can store program codes.

The above described are only exemplary embodiments of the present disclosure, which do not intend to limit the protection scope of the present disclosure. Any variation or substitution that is easily conceivable by those skilled in the art within the technical scope disclosed by the present disclosure shall fall into the protection scope of the present disclosure. Thus the protection scope of the present disclosure is defined by the appended claims.

The invention claimed is:

1. A pixel circuit comprising a display unit and a first precharge unit;
the first precharge unit is connected to the display unit, a $(N-1)^{th}$ scan line and a control line, and is configured to convert light energy into electric energy and to pre-charge the display unit with the converted electric energy under the control of the control line and the $(N-1)^{th}$ scan line;
the display unit is further connected to the $N^{th}$ scan line and a data line and is configured to charge the display unit through the data line under the control of the $N^{th}$ scan line;
wherein N≥2;
wherein the pixel circuit further comprises a second precharge unit;
the second precharge unit is connected to the display unit, the $(N-1)^{th}$ scan line and the control line, and is configured to convert light energy into electric energy and to reversely pre-charge the display unit under the control of the control line and the $(N-1)^{th}$ scan line;
wherein the first precharge unit and the second precharge unit do not work simultaneously.

2. The pixel circuit according to claim 1, wherein the first precharge unit includes a first transistor, a second transistor and a photosensitive energy storage element;
the first transistor has its gate connected to the control line, its first terminal connected to the $(N-1)^{th}$ scan line and its second terminal connected to a gate of the second transistor;
the second transistor has its first terminal connected to a first end of the display unit, and its second terminal connected to a first terminal of the photosensitive energy storage element;
the photosensitive energy storage element has its second terminal connected to a second end of the display unit.

3. The pixel circuit according to claim 2, wherein the second precharge unit includes a third transistor, a fourth transistor, and a photosensitive energy storage element;
the third transistor has its gate connected to the control line, its first terminal connected to the $(N-1)^{th}$ scan line and its second terminal connected to a gate of the fourth transistor;
the fourth transistor has its first terminal connected to the first end of the display unit and its second terminal connected to the second terminal of the photosensitive energy storage element;
the photosensitive energy storage element has its first terminal connected to the second end of the display unit;
wherein the first transistor and the third transistor are each P-type or N-type transistors, and the first transistor and the third transistor are mutually different types of transistors.

4. The pixel circuit according to claim 1, wherein the display unit includes a fifth transistor, a liquid crystal capacitor and a storage capacitor;
the fifth transistor has its gate connected to the $N^{th}$ scan line, its first terminal connected to the data line, and its second terminal connected to first ends of the liquid crystal capacitor and the storage capacitor;
the liquid crystal capacitor and the storage capacitor have their second ends connected to a common voltage terminal.

5. A display device comprising the pixel circuit according to claim 1.

6. The display device according to claim 5, wherein the first precharge unit includes a first transistor, a second transistor and a photosensitive energy storage element;
the first transistor has its gate connected to the control line, its first terminal connected to the $(N-1)^{th}$ scan line and its second terminal connected to a gate of the second transistor;
the second transistor has its first terminal connected to a first end of the display unit, and its second terminal connected to a first terminal of the photosensitive energy storage element;
the photosensitive energy storage element has its second terminal connected to a second end of the display unit.

7. The display device according to claim 6, wherein the second precharge unit includes a third transistor, a fourth transistor, and a photosensitive energy storage element;
the third transistor has its gate connected to the control line, its first terminal connected to the $(N-1)^{th}$ scan line and its second terminal connected to a gate of the fourth transistor;
the fourth transistor has its first terminal connected to the first end of the display unit and its second terminal connected to the second terminal of the photosensitive energy storage element;
the photosensitive energy storage element has its first terminal connected to the second end of the display unit;
wherein the first transistor and the third transistor are each P-type or N-type transistors, and the first transistor and the third transistor are mutually different types of transistors.

8. The display device according to claim 5, wherein the display unit includes a fifth transistor, a liquid crystal capacitor and a storage capacitor;
the fifth transistor has its gate connected to the $N^{th}$ scan line, its first terminal connected to the data line, and its second terminal connected to first ends of the liquid crystal capacitor and the storage capacitor;
the liquid crystal capacitor and the storage capacitor have their second ends connected to a common voltage terminal.

9. The pixel circuit according to claim 1, wherein the first precharge unit includes a first transistor, a second transistor and a photosensitive energy storage element;
the first transistor has its gate connected to the control line, its first terminal connected to the $(N-1)^{th}$ scan line and its second terminal connected to a gate of the second transistor;
the second transistor has its first terminal connected to a first end of the display unit, and its second terminal connected to a first terminal of the photosensitive energy storage element;
the photosensitive energy storage element has its second terminal connected to a second end of the display unit.

10. A driving method for a pixel circuit according to claim 1, comprising:
converting light energy into electric energy by the first precharge unit, and pre-charging the display unit connected to the $N^{th}$ scan line with the converted electric energy under the control of the control line and the $(N-1)^{th}$ scan line;

charging the display unit through the data line under the control of the $N^{th}$ scan line.

11. The driving method according to claim 10, wherein the pixel circuit comprises the second precharge unit and wherein the driving method comprises:

in a first frame, converting light energy into electric energy by the first precharge unit, and pre-charging the display unit connected to the $N^{th}$ scan line with the converted electric energy under the control of the control line and the $(N-1)^{th}$ scan line; and charging the display unit through the data line under the control of the $N^{th}$ scan line;

in a second frame, converting light energy into electric energy by the second precharge unit, and reversely pre-charging the display unit connected to the $N^{th}$ scan line with the converted electric energy under the control of the control line and the $(N-1)^{th}$ scan line; and reversely charging the display unit through the data line under the control of the $N^{th}$ scan line; and repeating the steps in the first frame and the second frame.

12. The driving method according to claim 11, wherein the first precharge unit includes a first transistor, a second transistor, and a photosensitive energy storage element, the first precharge unit converts light energy into electric energy and precharges the display unit connected to the $N^{th}$ scan line with the converted electric energy under the control of the control line and the $(N-1)^{th}$ scan line; the driving method further comprises:

while inputting scan signals into the $(N-1)^{th}$ scan line, inputting signals into the control line so as to turn on the first transistor and the second transistor, and then precharging the display unit connected to the $N^{th}$ scan line with the electric energy converted by the photosensitive energy storage element.

13. The driving method according to claim 12, wherein the second precharge unit includes a third transistor, a fourth transistor, and a photosensitive energy storage element, and wherein the second precharge unit converts the light energy into electric energy and reversely precharges the display unit connected to the $N^{th}$ scan line with the converted electric energy under the control of the control line and the $(N-1)^{th}$ scan line; the driving method further comprises:

while inputting scan signals into the $(N-1)^{th}$ scan line, inputting signals into the control line so as to turn on the third transistor and the fourth transistor, and then reversely precharging the display unit connected to the $N^{th}$ scan line with the electric energy converted by the photosensitive energy storage element.

14. The driving method according to claim 10, wherein the first precharge unit includes a first transistor, a second transistor, and a photosensitive energy storage element, the first precharge unit converts light energy into electric energy and precharges the display unit connected to the $N^{th}$ scan line with the converted electric energy under the control of the control line and the $(N-1)^{th}$ scan line; the driving method further comprises:

while inputting scan signals into the $(N-1)^{th}$ scan line, inputting signals into the control line so as to turn on the first transistor and the second transistor, and then precharging the display unit connected to the $N^{th}$ scan line with the electric energy converted by the photosensitive energy storage element.

* * * * *